United States Patent [19]

Bertsch

[11] 4,180,427
[45] Dec. 25, 1979

[54] FOAMED THERMOPLASTIC MATERIAL LAMINATED WITH A SHEET-LIKE COVERING MATERIAL

[75] Inventor: Paul J. Bertsch, Riverdale, N.J.

[73] Assignee: Primex Plastics Co., Oakland, N.J.

[21] Appl. No.: 861,562

[22] Filed: Dec. 16, 1977

[51] Int. Cl.² .................. B29C 19/02; B65C 9/25; B29H 7/20

[52] U.S. Cl. .................. 156/272; 156/322; 264/22; 264/48

[58] Field of Search .......... 156/272, 322, 324, 380, 156/499, 555; 264/22, 48, DIG. 18

[56] References Cited

U.S. PATENT DOCUMENTS

| | | | |
|---|---|---|---|
| 3,180,778 | 4/1965 | Rinderspacher et al. | 156/322 |
| 3,333,032 | 7/1967 | Dickinson | 264/22 |
| 3,651,181 | 3/1972 | Ramaika | 264/48 |
| 3,823,047 | 7/1974 | Colombo | 156/322 |
| 3,930,917 | 1/1976 | Esakov | 156/322 |

Primary Examiner—Douglas J. Drummond
Attorney, Agent, or Firm—Toren, McGeady and Stanger

[57] ABSTRACT

A layer of foamed thermoplastic material, such as polystyrene foam, is coated on at least one of its surfaces with a sheet of covering material. The covering material can be kraft paper, metal foil, a fabric or similar sheet-like material. To assure adequate adherence of the covering material to the foamed material, a corona discharge is directed against the surface of the foamed material to burn away any impurities and destroy the residual monomer film. The covering material is heated to a temperature above the melting point of the foamed material and then applied to the treated surface in a way that the foam cells are not damaged. During the laminating operation, heat from the covering material aids the bonding of the foamed material to the covering material. Further, the heat transmitted to the foamed material causes it to expand and reduce in density.

12 Claims, 1 Drawing Figure

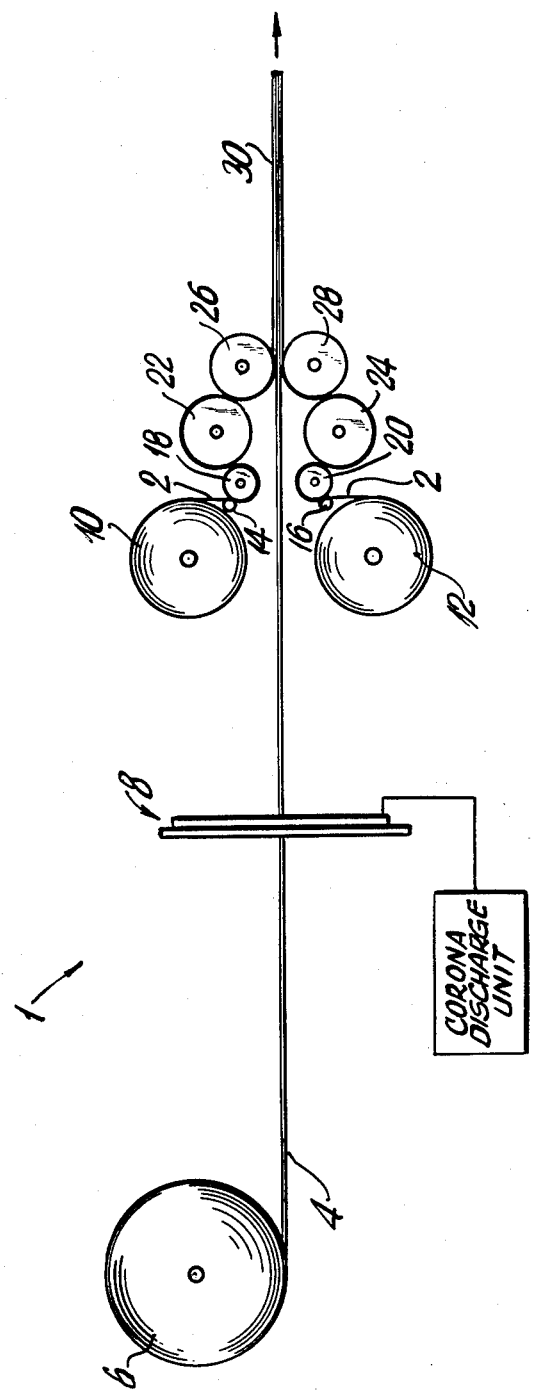

FOAMED THERMOPLASTIC MATERIAL LAMINATED WITH A SHEET-LIKE COVERING MATERIAL

BACKGROUND OF THE INVENTION

1. Field of the Invention

The present invention is directed to a method of and an apparatus for laminating covering material in sheet form to a foamed plastic substrate and, more particularly, it is directed to the treatment of the surface of the plastic substrate prior to the laminating operation.

2. Description of the Prior Art

The utility of a laminated sheet consisting of a foamed thermoplastic core sandwiched between two sheets of covering material has long been recognized. In U.S. Pat. No. 2,770,406 a carton is disclosed constructed from a laminate of a polystyrene foam core sandwiched between two sheets of kraft paper. Such a laminate can be used to replace corrugated paper board or wood in many carton and crate applications, particularly where insulation is required for frozen items, such as ice cream, frozen meat and vegetables, or as a shipping carton for chilled food and produce. In such known applications, the density of the polystyrene foam can vary in the range from 2 to 10 pounds per cubic foot with the commonly preferred density being about 3 pounds per cubic foot. If the density of the foam approaches 10 pounds per cubic foot, it involves an unnecessary expense for the plastic material, however, if the foam is expanded to an extent that the gas bubbles formed become too large, the resultant product when cooled will tend to be too brittle and crack upon the application of any pressure. Accordingly, foamed material having a density of about 3 pounds per cubic foot appears to be most suitable for lamination between sheets of kraft paper. The above patent suggests a convenient method of forming the laminate by placing a sheet of polystyrene containing a foaming agent between two sheets of kraft paper so that heating and foaming takes place in the polystyrene while pressure is applied against the heated kraft paper sheet, whereby the parts of the laminate will adhere together without using any adhesive material.

In U.S. Pat. No. 3,062,698 another laminate of polystyrene foam and kraft paper is described where heat is applied to the foamed polystyrene layer through the kraft paper so that the polystyrene is neither heated nor softened before it is contacted by the paper.

In another process for forming laminate disclosed in U.S. Pat. No. 3,823,047, the kraft paper is supplied to the laminating operation at a temperature above the melting point of the foamed material while the foamed material is introduced at ambient temperature.

In the past difficulties have been experienced in achieving adequate adherence of the covering sheet to the foamed material without damaging the foamed material. Unnecessarily heating the foamed material, or applying more than a light pressure in effecting the lamination, tends to have a deleterious effect on the laminated product.

SUMMARY OF THE INVENTION

Therefore, it is the primary object of the present invention to treat the surface of the foamed plastic material prior to the laminating step without heating the plastic material. Further, the covering material is heated to a temperature above the melting point of the plastic material immediately preceding the laminating operation so that heat transmitted to the plastic material during lamination causes it to bond to the covering material.

Another object of the present invention is to carry out the laminating operation with only a minimum application of pressure to prevent any damage to the foam cells in the plastic material. Still another object of the present invention is to provide a laminated member which affords excellent adhesion between the covering material and the foamed core and where the laminated member is flatter and has a more uniform thickness than has been possible in the past.

In accordance with the present invention, the surface of the foamed thermoplastic layer to be coated with the covering material is treated with a corona discharge to burn away any impurities and to break up the residual monomer film on its surface by oxidation and polar group formation. As the sheet-form covering material is moved into position for the laminating step, it is heated above the melting point of the foamed plastic material and then, while ensuring that there is no loss of heat in the covering material, it is lightly pressed against the treated surface of the foamed material providing the laminated member. The heat transmitted to the foamed material aids in the bonding of the corona treated surfaces of the foamed plastic to the covering materials.

As the laminating operation takes place, the heat transferred to the foamed material causes it to expand with a resultant reduction in density. The speed at which the layer of foamed material and the covering material is fed to the laminating station assures that, though the foam structure is expanded, there is no damage to the resulting laminated member.

A significant feature of the present invention is the simplified apparatus for effecting the corona discharge which assures that the surface of the foamed material is adequately treated while it is delivered at a relatively high rate of speed to the laminating station.

While in a preferred embodiment of the present invention the laminated member is formed of a polystyrene foam between sheets of kraft paper, the core material can be any of the known plastic materials capable of being foamed and the covering material can be selected, in accordance with the use of the laminated member, from a broad range of sheet materials, including but not limited to paper, textiles, metal foil and plastic film.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The FIGURE is a schematic illustration showing the lamination of sheets of covering material onto a layer of foamed thermoplastic material in accordance with the present invention.

DETAILED DESCRIPTION OF THE INVENTION

In the drawing an apparatus 1 is shown for laminating continuous sheets of kraft paper 2 to a continuous layer of polystyrene foam 4. The temperature and other operating conditions relate to the lamination of the kraft paper onto the polystyrene foam core, however, the process and apparatus are not limited to these materials and any plastic material capable of being foamed can be used as the core with the covering material being any of paper, textiles, metal foils, plastic films and other similar flexible sheet-like covering materials.

After the polystyrene foam layer 4 has been extruded, it is formed into a roll 6 for subsequent use. Preferably, the extruded foam material is aged for at least 24 hours. Immediately after the foam is extruded and cooled, because of the conditions under which the foaming takes place, the gas pressure in the foam cells is below atmospheric pressure and any heating which takes place at that time will produce little or no increase in the thickness of the foam layer, that is, there will be no reduction in its density. If the layer of foamed material is stored for at least 24 hours at atmospheric pressure, however, the ambient air diffuses into the foam cells so that the cells are at atmospheric pressure. Accordingly, any subsequent heating of the foamed layer causes a heat expansion of the air within the foam cells with a significant increase in the thickness of the layer. Accordingly, the polystyrene foam layer 4 is stored for at least 24 hours before it is used in the process embodying the present invention.

Initially, the layer of polystyrene foam 4 is unwound from the aged roll 6 and passed through a corona discharge device 8. As shown in the drawing, both sides of the polystyrene foam layer 4 are to be covered by the kraft paper 2, however, it can be appreciated that the application of the covering material can be limited to one surface of the foamed material layer. Accordingly, the corona discharge device 8 is adapted to treat either one or both surfaces of the layer 4 as it moves through the device. The corona discharge or corona treatment of the foamed layer involves a bombardment and penetration with a continuous plasma of ionized particles generated by the combination of a high-frequency power generator and a high voltage transformer. In addition to the generator and transformer, the corona discharge device includes a stationary electrode and a covered treater roll forming a return electrode. The bombardment of the surface of the foam layer 4 burns away any impurities and breaks up and destroys the film of residual monomer on the surface of the layer. The breakup of the film of residual monomer occurs due to oxidation and polar formation. The presence of impurities and the residual monomer film on the surface of the foam is a deterrent in bonding the sheet-like covering material to the layer. Accordingly, the corona treatment prepares the surface for the adherence of the covering material and assures the removal from the surface of any elements which would defeat the effective adherence.

As the treated foamed layer 4 moves downstream from the corona treatment device 8, the two continuous strips of kraft paper 2 are unwound from the upper and lower paper rolls 10 and 12. The kraft paper on these rolls if generally the same width as the foamed material layer 4. As mentioned above, the covering material is not limited to the kraft paper 2 and any other flexible sheet material appropriate for use with a foamed plastic material can be used in forming the laminate. Moreover, if the covering material is only applied to one side of the layer then, of course, only the portion of the apparatus shown downstream of the corona device 8 and above or below the layer would be needed.

As the two continuous sheets or strips of kraft paper 2 are withdrawn from the rolls 10 and 12, the paper passes first over the idler rolls 14, 16 and then over guide rolls 18, 20. Next the paper passes over heating rolls 22, 24, which rolls are maintained at a temperature in the range of 350° to 550° F. The rolls 22, 24 can be heated by circulating a heating fluid through them. Oil, which does not boil in the 550° to 700° F. temperature range, or superheated steam can be passed through the rolls top achieve the desired temperature. The temperature of the rolls is selected so that the paper 2, after passing in contact with the rolls, is in the range of 350° to 450° F., that is, above the melting point of the polystyrene foam layer 4.

From the heating rolls 22, 24 the strips of paper are fed into the nip formed between the laminating rolls 26,28. As can be seen, the foamed layer 4 also passes through the nip between the two strips of paper. The laminating rolls are heated to maintain the temperature of the paper 2 as it passes around the rolls 26, 28 into contact with the foam material layer. Preferably, the laminating rolls are heated in the range of 230° to 330° F. The spacing between the laminating rolls 26, 28 is adjusted so that only a light pressure is applied to the laminated article to prevent any damage to the foam layer. If an excessive amount of pressure is applied, the foam cells will be deformed or even crushed resulting in an increase in density of the foam layer. The only pressure applied by the laminating rolls is that amount sufficient to assure good contact of the strips of paper 2 with the foam layer 4. Because the paper 2 is heated to the range of 350° to 450° F., above the melting point of the polystyrene foam layer 4, the contact of the heated paper transmits heat into the polystyrene foam layer causing an almost immediate melting of the surface of the layer for assuring adherence between the substrate and the covering layers. Immediately following the passage of the paper and foam layers through the laminating rolls, the laminated member 30 is exposed to the ambient atmosphere and the melting which occurred is followed by a rapid cooling below the melting point of the foamed material assuring excellent adherence between the outer paper layers and the foamed substrate layer.

Since the surfaces of the foam layer 4 have been corona treated before passing through the laminating rolls, there are no elements present on the surface of the foam layer which would tend to prevent adequate adherence, only a light pressure is needed to assure the adherence of the paper and the foam layer. In the past the pressure applied to afford the desired contact for adhesion has been such that it resulted in cracking or rupturing of the foam cells in the layer. Moreover, since the foam layer is not directly exposed to heat as has been the case in the past, there is not the tendency for the layer to melt and form an unusable end product. In addition, because of the condition of the foam layer as it passes through the laminating rolls, it will tend to be flatter and more uniform in thickness. In accordance with the present invention, passing the foam layer through the laminating rolls with the application of only a light pressure, results in a planar product of more uniform thickness without the warpage that has been experienced in similar laminated articles in the past.

When the polystyrene foam layer 4 leaves the extruder and is cooled, it has a density of approximately 3 pounds per cubic foot. By permitting the layer to age for at least 24 hours, and by exposing the layer very briefly to heat as it passes through the laminating rolls, the layer will expand from a thickness of approximately ⅛ of an inch to approximately ¼ of an inch and its density will decrease to about 2 pounds per cubic foot. Any standard width of the foam layer can be used, such as 24, 36, 48 inches or even wider if necessary. In a typical application, the kraft paper would be in a range of 90 to 160 pounds per ream on a 36 inch diameter roll.

One application of the laminated member formed in this process would be as roof and siding sheeting for mobile homes and other structures where light weight, strength and good insulating properties with minimum thickness are desired. Further, the laminated article can be used as a substitute for corrugated paperboard in applications where light weight and effective insulating properties are needed, since the foamed plastic layer provides an excellent heat insulator.

In laminating the kraft paper to the polystyrene foam layer, each of the strips or sheets is conveyed at a speed of about 30 to 35 feet per minute. This relatively high speed is permitted because of the corona treatment and the manner in which the paper is placed in contact with the foam layer for providing the laminated article. Since the covering material and the foam layer pass very quickly through the laminating rolls, there is no danger of the foam layer becoming overheated and resulting in a damaged or useless end product.

As mentioned above, a covering sheet can be applied to one or both of the opposite faces of the foam layer 4. In addition, a laminated product with multiple foam layers can be produced in accordance with the present invention. If a multi-foam layer laminate is to be produced, a first laminated part, such as part 30 exiting from the laminating rolls 26, 28 in the drawing, is combined with a second layer having a covering material on only one of its faces. The first and second laminated parts are then conveyed through another set of laminating rolls, not shown, such as the rolls 26 and 28 to provide the multi-foam layer product, the final laminating step must be carried out with the uncovered surface of the second layer having been corona treated and the covering material on the first layer still sufficiently heated to assure adequate adherence to the second foam layer.

Where the laminated product is used for insulating purposes, it is advantageous to place an aluminum or metal foil covering on the foam layer so that the foil can act as a heat reflective layer. Foil can be laminated directly to the foam layer 4 without adhesives and can be substituted for at least one of the sheets of covering material 2 so that a laminated product is formed consisting of a layer of metal foil and a layer of thermoplastic foam or a layer of thermoplastic foam sandwiched between a layer of metal foil and a layer of another covering material.

While specific embodiments of the invention have been shown and described in detail to illustrate the application of the inventive principles, it will be understood that the invention may be embodied otherwise without departing from such principles.

What is claimed is:

1. A process for laminating a sheet of covering material onto a surface of a layer of foamed thermoplastic material comprising the steps of cooling and aging for at least 24 hours the layer of foamed thermoplastic material, moving the layer of cooled and aged foamed thermoplastic material along a path of travel, bombarding the surface to receive the sheet of covering material as it moves along the path of travel with a continuous plasma of ionized particles for burning away impurities on the surface and breaking up the film of residual monomer thereon, heating the sheet of covering material to a temperature above the melting point of the thermoplastic material, and applying the heated sheet directly to the bombarded surface of the layer of thermoplastic material as it continues along the path of travel for adhering the sheet and the foamed material and forming a laminated member.

2. A process, as set forth in claim 1, including extruding the foamed thermoplastic material in sheet form, and cooling the extruded material to room temperature, before using the aged foamed thermoplastic material for forming the laminated member.

3. A process, as set forth in claim 1, including extruding the foamed thermoplastic material in sheet form, and cooling the extruded material to room temperature for providing it with a density of approximately 3 pounds per cubic foot.

4. A process, as set forth in claim 1, comprising applying the sheet of covering material with only light pressure to the surface of the thermoplastic material to avoid any damage to the foamed thermoplastic material or any increase in the density thereof.

5. A process, as set forth in claim 2, including moving a continuous sheet of the aged foamed thermoplastic material along the path of travel and applying a continuous sheet of the covering material to at least one surface of the thermoplastic material which has been bombarded.

6. A process, as set forth in claim 2, including moving a continuous first sheet of the aged foamed thermoplastic material along the path of travel, bombarding the opposite surfaces of the sheet of thermoplastic material with a continuous plasma of ionized particles for burning away impurities on the surface and breaking up the film of residual monomer thereon, heating continuous first sheets of the covering material, moving the first sheets of covering material in the direction of movement of the first sheet of foamed thermoplastic material with each first sheet of covering material moving along a different one of the opposite bombarded surfaces of the first sheet of thermoplastic material, heating each of the first sheets of covering material, forming a nip between a pair of rollers and passing the first sheet of thermoplastic material through the nip with one first sheet of the heated covering being applied to one surface of the first sheet of thermoplastic mateial and the other first sheet of covering material being applied to the opposite surface of the first sheet of thermoplastic material, and supplying heat to the rollers forming the nip for maintaining the heated condition of the sheets of covering material as they are applied to the thermoplastic material, and applying a light pressure through the rollers forming the nip for adhering the first sheets of covering material to the first sheet of thermoplastic material so that the foam cell structure in the thermoplastic material is not damaged and there is no increase in density of the foamed thermoplastic material.

7. A process, as set forth in claim 6, comprising moving a continuous second sheet of aged foam thermoplastic material along a path of travel, bombarding the opposite surfaces of the second sheet of thermoplastic material with a continuous plasma of ionized particles for burning away impurities on the surfaces and breaking up the film of residual monomer thereon, heating a second sheet of covering material to a temperature above the melting point of the thermoplastic material, applying the heated second sheet of covering material directly to one bombarded surface of the second sheet of thermoplastic material for adhering the sheet and thermoplastic material together, placing the other bombarded surface of the second sheet of thermoplastic material into contact with one of the first sheets of covering material applied to the first sheet of foamed thermoplastic material while the first sheet of covering material remains in the heated condition and applying light pressure for adhering the second sheet of foamed thermoplastic material to the first sheet of covering material for providing a laminated article comprising two sheets of thermoplastic material with a covering material covering the outwardly facing surfaces of the sheets and with covering material separating the juxtaposed surfaces of the two sheets of the plastic material.

8. A process, as set forth in claim 1, wherein the foamed thermoplastic material is a polystyrene foam.

9. A process, as set forth in claim 8, wherein said covering material is kraft paper.

10. A process, as set forth in claim 8, wherein the covering material is a metal foil.

11. A process, as set forth in claim 8, wherein the covering material is a textile fabric.

12. A process, as set forth in claim 8, wherein the covering material is a thermoplastic film.

* * * * *